US011286136B2

(12) United States Patent
Gunji (10) Patent No.: US 11,286,136 B2
(45) Date of Patent: Mar. 29, 2022

(54) CONVEYING DEVICE

(71) Applicant: HIRATA CORPORATION, Kumamoto (JP)

(72) Inventor: Keishi Gunji, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 244 days.

(21) Appl. No.: 16/575,526

(22) Filed: Sep. 19, 2019

(65) Prior Publication Data

US 2020/0010307 A1    Jan. 9, 2020

Related U.S. Application Data

(63) Continuation of application No. PCT/JP2017/013697, filed on Mar. 31, 2017.

(51) Int. Cl.
*B66C 13/00* (2006.01)
*B66C 13/06* (2006.01)
(Continued)

(52) U.S. Cl.
CPC .............. *B66C 13/06* (2013.01); *B65F 3/22* (2013.01); *B66C 13/08* (2013.01); *B66C 17/04* (2013.01); *B66D 1/50* (2013.01); *B66C 2700/082* (2013.01)

(58) Field of Classification Search
CPC ......... B66C 13/06; B66C 13/04; B66C 13/08; B66C 17/04; B66C 17/06; B66D 1/26
See application file for complete search history.

(56) References Cited

U.S. PATENT DOCUMENTS 3,971,478 A * 7/1976 Matasa ..................... B66C 1/24
212/274
4,350,254 A * 9/1982 Noly ....................... B66C 13/08
212/242
(Continued)

FOREIGN PATENT DOCUMENTS

CN         2433230 Y      6/2001
CN         1496330 A      5/2004
(Continued)

OTHER PUBLICATIONS

Office Action/Partial Search Report dated Mar. 12, 2021, in corresponding Chinese Patent Application No. 201780089053.7, with English translation . (22 pages).
(Continued)

*Primary Examiner* — Emmanuel M Marcelo
(74) *Attorney, Agent, or Firm* — Buchanan Ingersoll & Rooney PC (57) ABSTRACT

A conveying device of the present invention includes a holding unit configured to hold a conveying object, a support member swingably supporting the holding unit, a plurality of hanging members, each distal end of which is connected to the support member so as to hang the holding unit via the support member, reel units to which each proximal end of the plurality of hanging members is connected so as to be capable of feeding and wounding, a base part on which the plurality of reel units are mounted, a guide unit configured to engage with the holding unit, and guide the holding unit to be elevated, and a control unit configured to perform operation control on the reel units so as to feed and wind the hanging member.

10 Claims, 5 Drawing Sheets

(51) Int. Cl.
*B65F 3/22* (2006.01)
*B66C 13/08* (2006.01)
*B66C 17/04* (2006.01)
*B66D 1/50* (2006.01)

(56) References Cited

U.S. PATENT DOCUMENTS

| | | | | |
|---|---|---|---|---|
| 6,126,023 | A * | 10/2000 | Durrant-Whyte | B66C 13/06 212/274 |
| 7,267,240 | B2 * | 9/2007 | Maurer | B66C 13/063 212/270 |
| 7,789,253 | B2 * | 9/2010 | Sawai | B66C 23/36 212/301 |
| 8,708,172 | B2 * | 4/2014 | Kim | B66C 19/002 212/328 |
| 9,909,713 | B1 * | 3/2018 | Brockie | B66D 3/04 |
| 9,950,910 | B2 * | 4/2018 | Sorensen | B66D 1/505 |
| 2007/0216115 | A1 * | 9/2007 | Warner | B62B 1/12 280/47.27 |

FOREIGN PATENT DOCUMENTS

| | | | |
|---|---|---|---|
| CN | 106163949 | A | 11/2016 |
| CN | 205855865 | U | 1/2017 |
| JP | 55026119 | B2 | 7/1980 |
| JP | 61118698 | A | 6/1986 |
| JP | H07285782 | A | 10/1995 |
| JP | H10-081487 | A | 3/1998 |
| JP | 3362580 | B2 | 1/2003 |
| JP | 2006008355 | A | 1/2006 |
| JP | 4267742 | B2 | 2/2009 |
| WO | 0009435 | A1 | 2/2000 |
| WO | 02/076873 | A | 10/2002 |
| WO | 2014/080390 | A2 | 5/2014 |

OTHER PUBLICATIONS

Office Action dated Jun. 23, 2020, by the Chinese Patent Office in corresponding Chinese Patent Application No. 201780089053.7, and English translation (25 pages).

International Search Report (PCT/ISA/210) dated Jun. 27, 2017, by the Japan Patent Office as the International Searching Authority for International Application No. PCT/JP2017/013697.

Written Opinion (PCT/ISA/237) dated Jun. 27, 2017, by the Japan Patent Office as the International Searching Authority for International Application No. PCT/JP2017/013697.

Office Action dated Jul. 2, 2021, in corresponding Chinese Patent Application No. 201780089053.7 and English translation of the Office Action. (8 pages).

* cited by examiner

CONVEYING DEVICE

TECHNICAL FIELD

The present invention relates to workpiece transfer between a first workpiece standby position and a second workpiece-holding position, and relates to a conveying device which transfers workpieces whose respective positions are arranged up and down, and which transfers the workpieces along a transfer path disposed above the first workpiece standby position.

BACKGROUND ART

In order to transfer a workpiece (conveying object) in a space, an elevating mechanism is configured to be located in a moving body which moves along a path disposed above a plurality of work areas, and the elevating mechanism is driven. In this manner, a workpiece-holding unit for holding the workpieces performs an elevating operation so that the workpieces are fetched from the work areas or the workpieces are supplied to the work areas by the conveying device.

As the conveying device which moves above the work areas configured in this way, the following conveying device is known. The conveying device includes a traveling unit, the elevating mechanism, a holding mechanism, and a pair of elevating assist mechanisms. The elevating mechanism of the conveying device has a holding unit for holding the workpieces. A plurality of belts are connected to the holding unit. The holding unit is caused to perform elevating movement by a belt elevating mechanism which winds or unwinds the plurality of belts. In addition, the holding unit is supported by a cylindrical telescopic mechanism, and the telescopic mechanism stretches and shrinks in accordance with the elevating movement of the holding unit. In this manner, the telescopic mechanism guides the holding unit which holds the workpieces so as to perform the elevating operation (refer to Patent Document 1 below).

In addition, as the conveying device which carries out the same work, the following conveying device is known. The conveying device includes a pair of telescopic elevating mechanisms configured such that a plurality of plate-shaped moving bodies are connected to each other so as to be relatively movable, holding units respectively connected to a pair of the moving bodies arranged in a lower end portion when a pair of the moving bodies are relatively moved and telescopically operated, a pair of plate-shaped support bodies for supporting the moving bodies arranged in an upper end portion, a pair of connection drive mechanisms disposed along the support bodies and the plurality of moving bodies, and an elevating drive mechanism which supplies a driving force to the connection drive mechanism. In the conveying device, the pair of connection drive mechanisms is operated by driving the elevating drive mechanism. The plurality of moving bodies are relatively moved. In this manner, a total length thereof is caused to stretch and shrink so as to raise and lower the holding unit (refer to Patent Document 2 below).

Furthermore, as the conveying device which carries out the same work, the following conveying device is known. The conveying device has an overhead traveling carriage which elevates a platform while hanging the platform by using four hanging members. In the conveying device, two of the four hanging members for elevating the platform are attached to the platform via a swing arm capable of swinging in a vertical plane, and the other two hanging members are directly attached to the platform without using the swing arm. Accordingly, while tension is applied to all of the four hanging members for elevating the platform, the platform is supported at three points such as a fulcrum of the swing arm and attachment positions of the other two hanging members. Therefore, the same operation is performed (refer to Patent Document 3 below).

CITATION LIST

Patent Documents

Patent Document 1: Japanese Patent No. 3362580
Patent Document 2: Japanese Patent No. 4267742
Patent Document 3: Japanese Unexamined Patent Application, First Publication No. 2006-8355

SUMMARY OF INVENTION

Technical Problem

According to the device disclosed in Patent Document 1, the holding unit is hung and supported by the plurality of belts, and the respective rolling elements to which the plurality of belts are respectively connected are rotationally driven. In this manner, the belts are wound or unwound by a rolling operation of the rolling elements, thereby performing the elevating operation of the holding unit. Therefore, the plurality of rolling elements are synchronously driven, thereby performing the elevating operation while maintaining hanging balance of the holding unit. Consequently, if there is a variable thickness error in the respective belts or there is a dimensional error in respective diameters of the rolling elements, possibly affecting a hanging disposition of the holding unit during the elevating operation, for example, the holding unit may be inclined during the elevating operation.

According to the device disclosed in Patent Document 2, the holding unit performs an elevating movement by driving a pair of telescopic elevating mechanisms so as to perform the elevating operation. Accordingly, adjustment is required in order to synchronously operate the pair of telescopic elevating mechanisms. In addition, if each operation distance of the pair of telescopic elevating mechanisms increases, there is a possibility that the adjustment to synchronize the operations may be complicated. Furthermore, in order to support the holding unit by using the telescopic elevating mechanisms, it is necessary to increase rigidity of the telescopic elevating mechanisms in view of the operation (shaking) during the elevating movement, thereby causing a possibility that an overall weight of the device may increase.

According to the device disclosed in Patent Document 3, the holding unit is supported at the three points. A balance swinging mechanism is configured for one of the support points. The four belt members hang the holding unit via the balance swinging mechanism so that the holding unit performs the elevating operation. The holding unit is hung and supported only by the belts. Consequently, in a case of a long stroke, a production error of each belt amplifies vibrations, thereby causing a possibility that shaking may increase. In addition, it takes a long time to stabilize the holding unit at a stop position of the holding unit when the belt is unwound, thereby causing a possibility that transfer efficiency may be degraded.

The present invention is made in view of the above-described circumstances in the related art, and an object thereof is to prevent a holding unit that holds a workpiece (conveying object) from being inclined, and to prevent the holding unit from being shaken during an elevating operation of the holding unit.

Solution to Problem

According to the present invention, a conveying device is provided, including a holding unit configured to hold a conveying object, a support member swingably supporting the holding unit, a plurality of hanging members, each distal end of which is connected to the support member so as to hang the holding unit via the support member, reel units to which each proximal end of the plurality of hanging members is connected so as to be capable of feeding and wounding, a base part on which the plurality of reel units are mounted, a guide unit configured to engage with the holding unit, and guide the holding unit to be elevated, and a control unit configured to perform operation control on the reel units so as to feed and wind the hanging member.

In the conveying device according to the present invention, the support member may include a hanging holding member holding each distal end of the hanging members and a swinging connection portion to which the hanging holding member is connected so as to be pivotable on the support member.

In the conveying device according to the present invention, the hanging members may be belt members each having a predetermined width and thickness. The two belt members may be connected to the support member so as to be arranged side by side with each other at an interval in the width direction while a swing support portion of the support member for supporting the holding unit being located between the belt members. The belt members may be connected to the support member so that each hanging position of the two belt members is located at a position above a centroid position of the holding unit in the thickness direction.

The conveying device according to the present invention may further include an inclination detection unit configured to detect inclination of the holding unit with respect to the support member. The control unit may perform the operation control on the reel unit, based on a detection result obtained by the inclination detection unit.

In the conveying device according to the present invention, the guide unit may include a plate-shaped stationary guide body fixed to the base part, and extending in an elevating direction of the holding unit, and a plate-shaped moving guide body which is supported by the stationary guide body so as to be movable in the elevating direction of the holding unit, and with which the holding unit engages.

In the conveying device according to the present invention, the moving guide body may include a tip-moving guide body with which the holding unit engages, and an intermediate moving guide body located between the tip-moving guide body and the stationary guide body, and installed so as to be movable relative to each of the tip-moving guide body and the stationary guide body. The guide unit may include an interlocking mechanism configured to move the tip-moving guide body and the intermediate moving guide body in an interlocking state with each other, in accordance with an elevating operation of the holding unit.

In the conveying device according to the present invention, the stationary guide body may include a stationary guide rail with which an intermediate guide member installed on the intermediate moving guide body engages so as to guide movement of the intermediate guide member. The intermediate moving guide body may include the intermediate guide member and an intermediate guide rail with which a tip guide member installed on the tip-moving guide body engages so as to guide movement of the tip guide member. The tip-moving guide body may include the tip guide member, a tip guide rail with which a holding guide member installed on the holding unit engages so as to guide movement of the holding guide member, and an engaging target portion with which an engaging member installed on the holding unit engages. The interlocking mechanism may include a pair of rolling elements respectively attached to an upper portion and a lower portion of the intermediate moving guide body, and an endless belt member wound around the pair of rolling elements so as to drive with rolling of the rolling elements. The belt member may include one fixing portion in which a predetermined location on the moving guide body side is fixed to the moving guide body side, and the other fixing portion in which another location on the stationary guide body side, which is different from the predetermined location, is fixed to the stationary guide body side.

In the conveying device according to the present invention, the holding unit may be located between a pair of the guide units installed on the base part at an interval therebetween, and engages with both the guide units so as to be elevated by operating the reel unit.

The conveying device according to the present invention may further include a traveling unit that is installed on the base part and configured to cause the base part to travel along a transfer path formed in a direction intersecting an elevating direction.

Advantageous Effects of Invention

According to the present invention, the support member supports the holding unit so as to be capable of swinging. Accordingly, even if there is a posture change such as inclination of the support member due to a shape (thickness) error or a winding habit which may occur in the hanging member, the holding unit is not inclined without receiving influence therefrom. Therefore, the holding unit always maintains a horizontal state. In addition, since the holding unit is elevated while being guided by the guide unit, the holding unit is not shaken while being elevated. In this manner, the conveying object can be conveyed while maintaining improved stability when the holding unit is elevated. In this way, ensuring the improved stability while elevating the holding unit is effectively applicable to a case where an elevating stroke of the holding unit is increased by lengthening a length of the hanging member.

BRIEF DESCRIPTION OF DRAWINGS

Similar to FIG. 5B.

DESCRIPTION OF EMBODIMENT

Hereinafter, a conveying device according to the present invention will be described.

Figure 1:
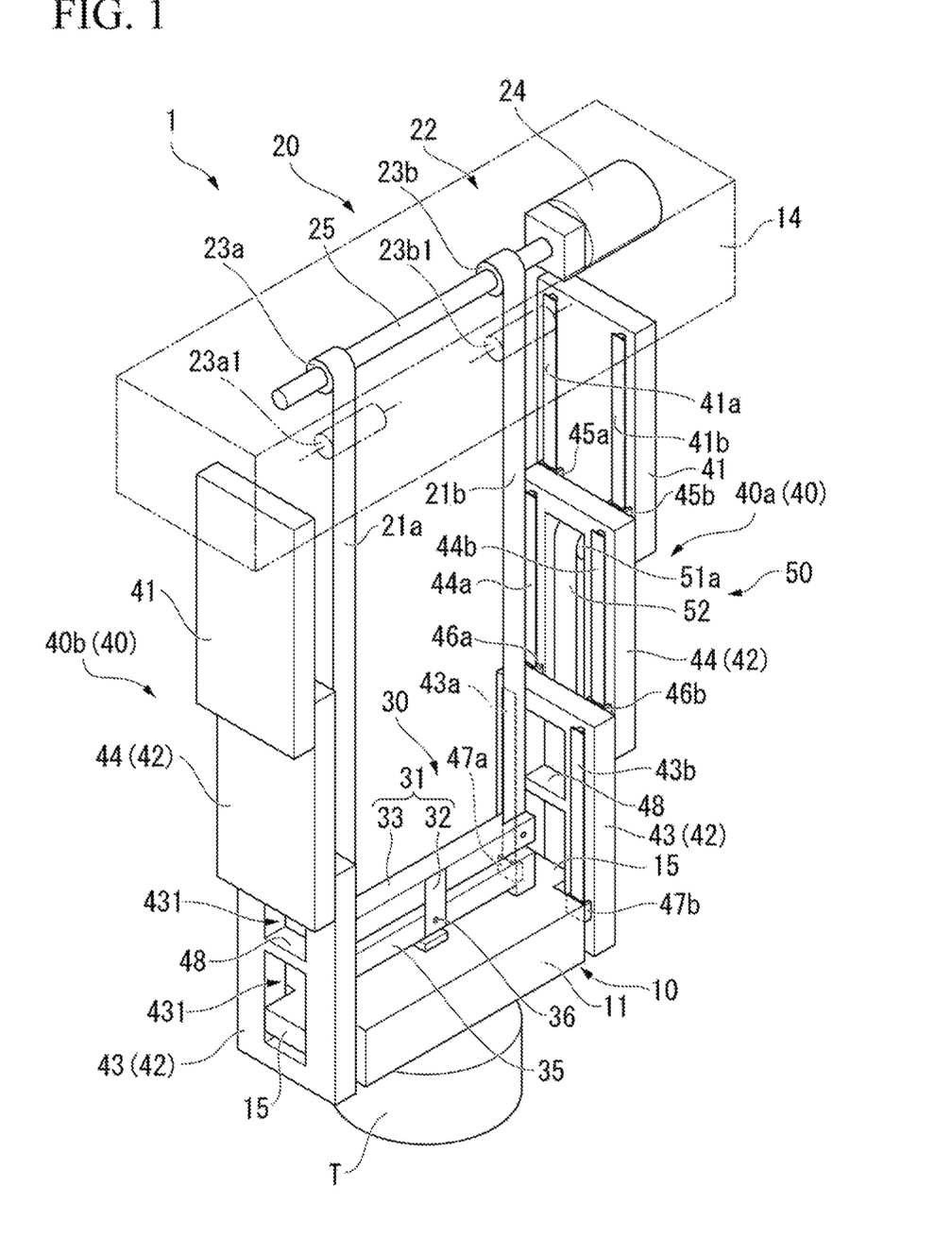
FIG. 1 is a perspective view illustrating a conveying device 1 according to a first embodiment of the present invention.
Figure 2:
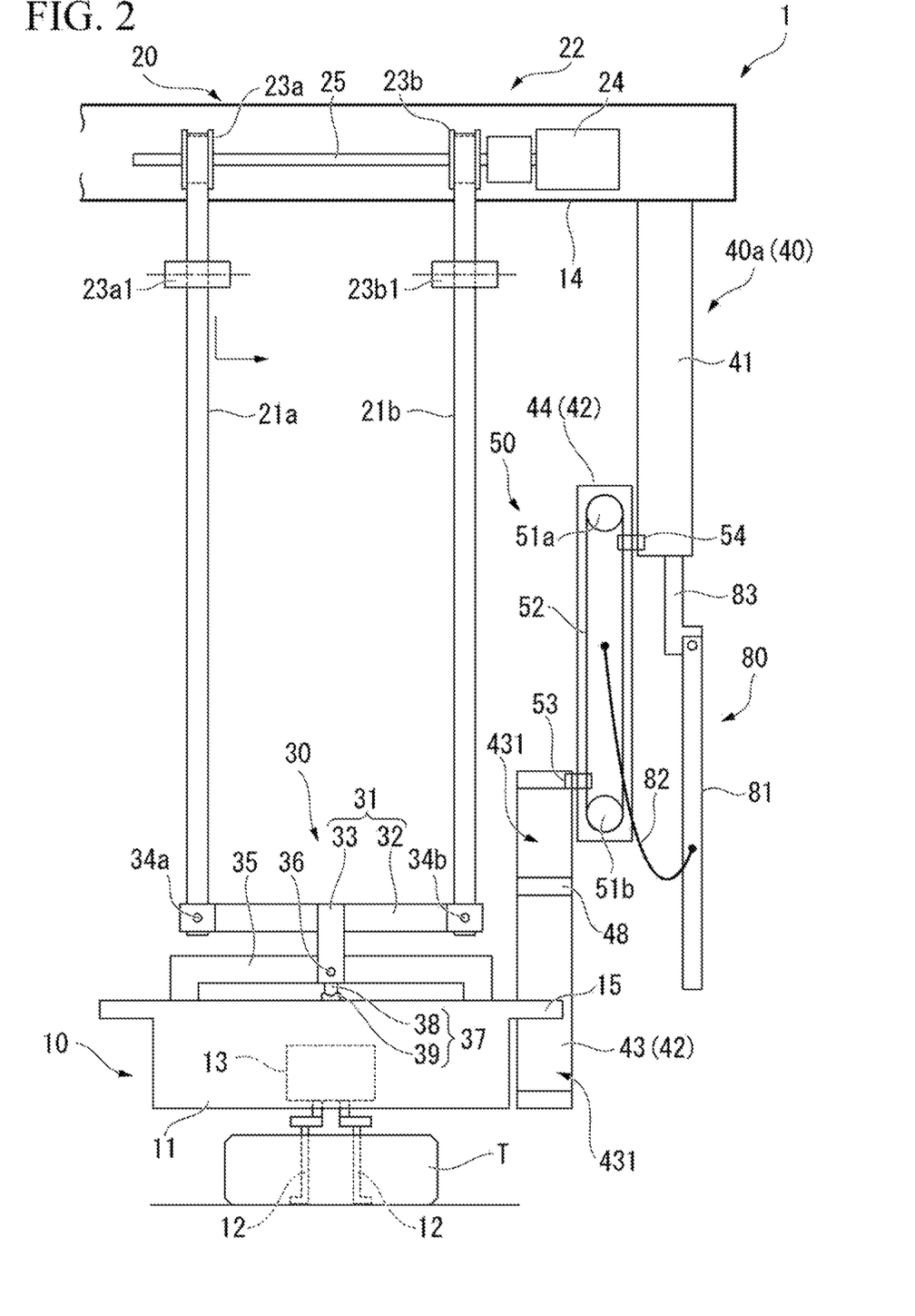
FIG. 2 is a front view of the conveying device 1 which illustrates a state where first and second guide units 40a and 40b are stretched.
Figure 3:
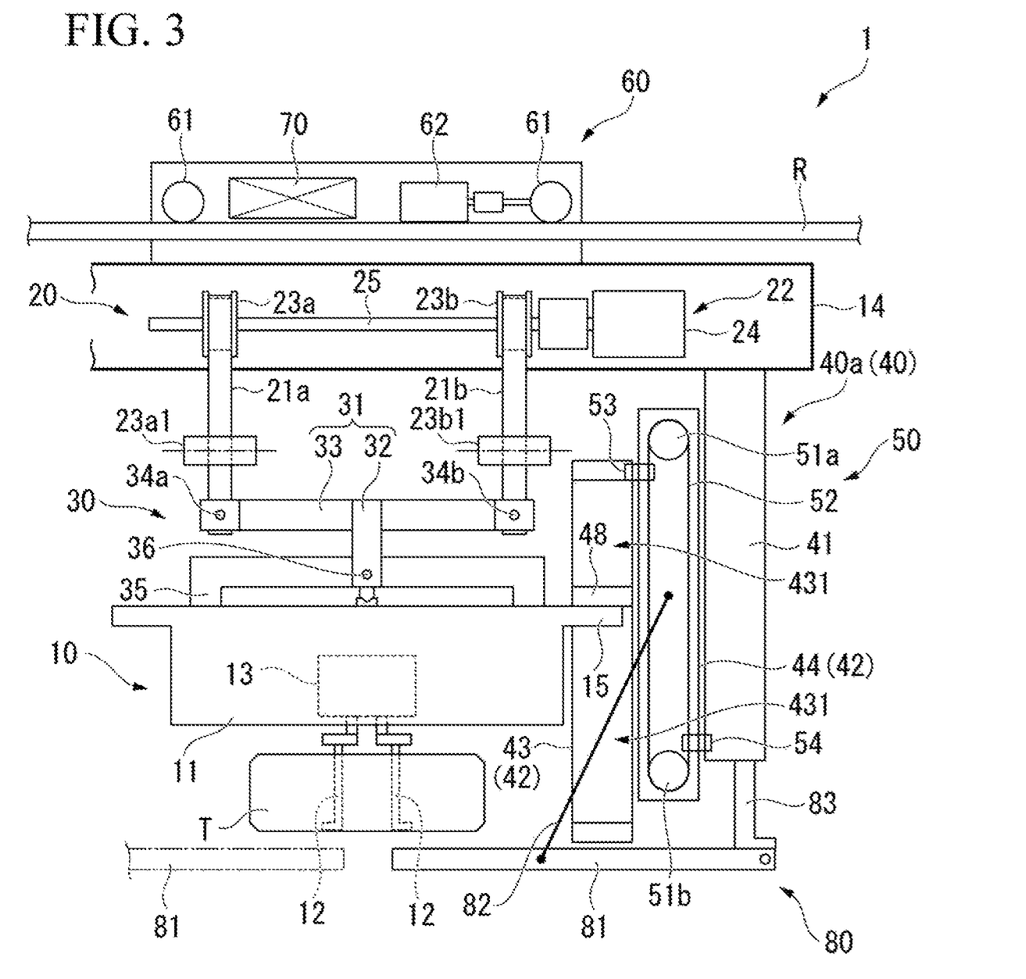
FIG. 3 is a front view of the conveying device 1 which illustrates a state where the first and second guide units 40a and 40b are shrunk.

As illustrated in FIGS. 1 to 3, a conveying device 1 according to a first embodiment of the present invention is a device for conveying a conveying object placed on a floor surface side inside a building such as a factory or a warehouse. The conveying device 1 includes a holding unit (holding unit) 10 that holds a tire T from an inner peripheral portion as the conveying object, an elevating unit 20 that elevates and lowers the holding unit 10 with respect to the floor surface of the building, a swing support unit (support member) 30 that swingably supports the holding unit 10 with respect to the elevating unit 20, an elevating guide unit (guide unit) 40 that guides the holding unit 10 elevated by the elevating unit 20, and a control unit (control unit) 70 that controls each operation of the holding unit 10 and the elevating unit 20. In addition, the conveying device 1 includes a traveling unit (traveling unit) 60 that is caused to travel along a rail (transfer path) R laid on a ceiling of the building so as to move the elevating unit 20 and the elevating guide unit 40 together with the holding unit 10. In addition, the conveying device 1 is allowed to travel by the control unit 70 controlling the traveling unit 60. In addition, the conveying device 1 includes a falling prevention mechanism 80 that prevents the tire T held by the holding unit 10 from falling.

The holding unit 10 has a housing 11, three bars 12 projecting downward from the housing 11, and a displacement mechanism 13 for displacing the three bars 12 so as to move close to or away from each other. The respective three bars 12 are arranged to be located at apex positions of an equilateral triangle with a phase difference of 60° with respect to a center portion of the tire T. The control unit 70 controls the displacement mechanism 13 so as to move the three bars 12 in a diameter enlarging direction. In this manner, the bars 12 are brought into contact with an inner peripheral portion of the tire T so as to hold the tire T. Alternatively, the three bars 12 are moved in a diameter-reducing direction. In this manner, the bars 12 are separated from the inner peripheral portion of the tire T so as to release the tire T.

The elevating unit 20 has a pair of belt members (hanging members) 21a and 21b which hang the holding unit 10, and an elevating drive mechanism 22 which is mounted on the base part 14 of the conveying device 1 so as to raise and lower the holding unit 10 by simultaneously feeding or winding the belt members 21a and 21b. The belt members 21a and 21b have a predetermined width and thickness.

The elevating drive mechanism 22 has two reel units 23a and 23b to which each proximal end of the belt members 21a and 21b is connected so as to be freely fed and wound, and a drive motor unit 24 for rotationally driving the reel units 23a and 23b. The reel units 23a and 23b are arranged at an interval therebetween on a peripheral surface of a shaft portion 25 parallel to a moving direction of the conveying device 1 moved by the traveling unit 60. The belt members 21a and 21b are respectively connected to the two reel units 23a and 23b. In addition, the elevating drive mechanism 22 has reel-assisting portions 23a1 and 23b1 which are respectively disposed at lower positions of the reel units 23a and 23b and which respectively regulate horizontal positions of the belt members 21a and 21b hanging in a vertical direction so as to coincide with a thickness direction of the belt members 21a and 21b. The reel-assisting portions 23a1 and 23b1 are respectively brought into contact with one surface in the thickness direction of the belt members 21a and 21b wound around the reel unit 23a and 23b, and are rotatably disposed around a rotation axis so as to prevent a change in the hanging position in the thickness direction of the belt members 21a and 21b changed due to a change in a winding diameter. The belt members 21a and 21b are adjusted by the reel-assisting portions 23a1 and 23b1 so that the hanging position in the vertical direction is located directly above a first swing connection portion 34a and a second swing connection portion 34b (to be described later). The reel-assisting portions 23a1 and 23b1 are respectively supported to be rotatable by a support member (not illustrated) formed on the traveling unit 60, and are arranged between the two reel units 23a and 23b and the holding unit 10.

The control unit 70 controls the drive motor unit 24 so as to rotate the shaft portion 25 in a forward direction. In this manner, the belt members 21a and 21b are simultaneously fed from the two the reel units 23a and 23b. Alternatively, the shaft portion 25 is rotated in a reverse direction so that the belt members 21a and 21b are simultaneously wound around the reel units 23a and 23b.

The swing support unit 30 has a hanging connection portion (hanging holding member) 31, and a first swing connection portion 34a and a second swing connection portion 34b which are installed on the hanging connection portion 31 and to which each distal end of the belt members 21a and 21b is connected so as to be pivotable. The hanging connection portion 31 has a horizontal support member 32 which has the same length as a separation distance of the reel units 23a and 23b, and in which the tips of the belt members 21a and 21b are respectively connected to both ends so as to be pivotable, and a vertical support member 33 whose upper end portion is fixed to the center of the horizontal support member 32, and which is hung from the horizontal support member 32. In the horizontal support member 32, a distal end of one belt member 21a is connected to one end of the horizontal support member 32 via the first swing connection portion 34a so as to be pivotable, and a distal end of the other belt 21b is connected to the other end of the horizontal support member 32 via the second swing connection portion 34b so as to be pivotable.

The hanging position of the vertical support member 33 is connected to a stationary support member 35 (to be described later) so as to substantially coincide with the centroid position of the holding unit 10 in a horizontal plane. In this manner, the two belt members 21a and 21b are hung and supported while maintaining centroid balance of the swing support unit 30 and the holding unit 10.

The stationary support member 35 is fixed to the upper surface of the housing 11 in the holding unit 10. The stationary support member 35 is a hanging bracket which maintains the centroid balance of the holding unit 10. Then, a lower end portion of the vertical support member 33 of the hanging connection portion 31 is pivotally supported by the stationary support member 35 via the swing support portion 36 at the centroid position of the holding unit 10 and the stationary support member 35. In this manner, the holding unit 10 is connected to the swing support unit 30 so as to be pivotable. A connection point between the vertical support member 33 and the stationary support member 35 is located directly above the centroid of the holding unit 10.

A posture detection unit (inclination detection unit) 37 that detects the relative inclination of the holding unit 10 with respect to the swing support unit 30 is disposed between the swing support unit 30 and the holding unit 10. The posture detection unit 37 has a detection target 38 installed on the vertical support member 33 and a state detection sensor 39 disposed on the upper surface of the housing 11 of the holding unit 10. The detection target 38 is disposed so as to protrude downward in a lower end of the vertical support member 33. While the holding unit 10 is elevated, the state detection sensor 39 always detects a position change of the holding unit 10 (housing 11) with respect to the detection target 38. For example, the state detection sensor 39 adopts an optical sensor, a mechanical contact sensor, or an image recognition sensor. The control unit 70 controls the drive motor unit 24 when a positional change amount of the holding unit 10 with respect to the detection target 38 exceeds a certain magnitude, based on a detection result of the state detection sensor 39. In this manner, the control unit 70 stops rotational driving of the shaft portion 25, and stops raising and lowering of the holding unit 10.

The elevating guide unit 40 has first and second guide units 40a and 40b which are installed on the lower portion of the base part 14 at an interval therebetween in the moving direction of the conveying device 1 moved by the traveling unit 60, and which are arranged across the holding unit 10. The housing 11 of the holding unit 10 is located between the first guide unit 40a and the second guide unit 40b, and engages with both of these. The first guide unit 40a and the second guide unit 40b have the same structure. Accordingly, hereinafter, the structure of the first guide unit 40a will be described. In the drawing, the same reference numerals will be given to the second guide unit 40b, and description thereof will be omitted.

The first guide unit 40a has a long plate-shaped stationary guide body 41 which is fixed to the lower portion of the base part 14 and which extends in the elevating direction of the holding unit 10, and a moving guide body 42 which is supported so as to be slidable with respect to the stationary guide body 41. The holding unit 10 engages with the moving guide body 42. The moving guide body 42 includes an intermediate moving guide body 44 supported so as to be slidable with respect to the stationary guide body 41, and a tip-moving guide body 43 supported so as to be slidable with respect to the intermediate moving guide body 44. The first guide unit 40a has an interlocking mechanism 50 which causes the tip-moving guide body 43 and the intermediate moving guide body 44 to stretch and shrink in an interlocking state with each other, in accordance with the elevating operation of the holding unit 10.

The stationary guide body 41 has a rectangular plate shape, and the upper end in the longitudinal direction is fixed to the lower portion of the base part 14 and is hung from the base part 14. The stationary guide body 41 has two stationary guide rails 41a and 41b which extend in the same direction as that of the elevating operation of the holding unit 10. The stationary guide rails 41a and 41b are fixed in parallel along the longitudinal direction of the stationary guide body 41 to an inner surface (surface on the holding unit 10 side) of the stationary guide body 41.

The intermediate moving guide body 44 also has the rectangular plate shape, and includes intermediate guide members 45a and 45b on an outer surface (surface on the stationary guide body 41 side) of the intermediate moving guide body 44. The intermediate guide members 45a and 45b respectively engage with the stationary guide rails 41a and 41b so as to be slidable. The intermediate guide members 45a and 45b slide along the stationary guide rails 41a and 41b, thereby causing the intermediate moving guide body 44 to slide with respect to the stationary guide body 41. In this manner, the intermediate moving guide body 44 stretches and shrinks with respect to the stationary guide body 41.

Similarly, the intermediate moving guide body 44 has two intermediate guide rails 44a and 44b extending in the same direction as that of the elevating operation of the holding unit 10. The intermediate guide rails 44a and 44b are fixed in parallel along the longitudinal direction of the intermediate moving guide body 44 on the inner surface (surface on the holding unit 10 side) of the intermediate moving guide body 44. On the other hand, the tip-moving guide body 43 also has a rectangular plate shape, and the tip guide members 46a and 46b are provided on the outer surface (surface on the intermediate moving guide body 44 side) of the tip-moving guide body 43. The tip guide members 46a and 46b respectively engage with the intermediate guide rails 44a and 44b so as to be slidable. The tip guide members 46a and 46b slide along the intermediate guide rails 44a and 44b, thereby causing the tip-moving guide body 43 to slide with respect to the intermediate moving guide body 44. In this manner, the tip-moving guide body 43 stretches and shrinks with respect to the intermediate moving guide body 44.

The tip-moving guide body 43 has two tip guide rails 43a and 43b extending in the elevating direction of the holding unit 10. The tip guide rails 43a and 43b are fixed in parallel along the longitudinal direction of the tip-moving guide body 43 to the inner surface (surface on the holding unit 10 side) of the tip-moving guide body 43. On the other hand, the holding unit 10 includes holding guide members 47a and 47b on the outer surface (surface on the tip-moving guide body 43 side). The holding guide members 47a and 47b respectively engage with the tip guide rails 43a and 43b so as to be slidable. The holding guide members 47a and 47b slide along the tip guide rails 43a and 43b, thereby causing the holding unit 10 to slide with respect to the tip-moving guide body 43, and the holding unit 10 is guided to be elevated.

The tip-moving guide body 43 has upper and lower rectangular long holes 431 and 431 extending in the longitudinal direction. In addition, in the holding unit 10, both ends in the longitudinal direction (rightward-leftward direction in FIG. 2) of the housing 11 include engaging portions 15 and 15 engaging with a lower side long hole 431 of the tip-moving guide body 43. The engaging target portion 48 is disposed between the long holes 431 and 431, and the engaging portion 15 comes into contact with the engaging target portion 48 from below, thereby regulating the upward movement of the holding unit 10 with respect to the tip-moving guide body 43.

The interlocking mechanism 50 has a pair of pulleys (rolling elements) 51a and 51b rotatably attached to the upper portion and the lower portion of the intermediate moving guide body 44, an endless belt member 52 wound between the pulleys 51a and 51b, and a first belt-fixing portion (one fixing portion) 53 and a second belt-fixing portion (other fixing portion) 54 which are installed on the outer peripheral surface of the endless belt member 52. The endless belt member 52 is wound between the pulleys 51a and 51b, and is properly tensioned. The first belt-fixing portion 53 is installed on the tip-moving guide body 43 side on the outer peripheral surface of the endless belt member 52. In addition, the second belt-fixing portion 54 is installed on of the stationary guide body 41 side on the outer peripheral surface of the endless belt member 52. Furthermore, the respective attachment positions of the first belt-fixing portion 53 and the second belt-fixing portion 54 are adjusted so that both of these are located at opposite positions equally dividing the length in the circumferential direction of the endless belt member 52.

In addition, the first belt-fixing portion 53 is fixed to the upper end of the tip-moving guide body 43, and the second belt-fixing portion 54 is fixed to the lower end of the stationary guide body 41. In this manner, the first belt-fixing portion 53 is raised (or lowered). Accordingly, the endless belt member 52 is driven to travel, and the pulley 51a and the pulley 51b are rotated. Here, the second belt-fixing portion 54 fixed to the endless belt member 52 is fixed to the lower end of the stationary guide body 41. Accordingly, the second belt-fixing portion 54 is not actually lowered (or raised). Therefore, instead of the second belt-fixing portion 54 being lowered (or raised), the intermediate moving guide body 44 is raised (or lowered) with respect to the stationary guide body 41, and the intermediate moving guide body 44 shrinks (or stretches) with respect to the stationary guide body 41.

Herein, an interlocking operation of the tip-moving guide body 43 and the intermediate moving guide body 44 will be described. FIG. 2 illustrates a state where the tip-moving guide body 43 is located at a lowest position in a movable range with respect to the intermediate moving guide body 44 and the intermediate moving guide body 44 is located at the lowest position in the movable range with respect to the stationary guide body 41. In this case, the first guide unit 40a (or the second guide unit 40b) is in a state of stretching downward most. The upper end of the tip-moving guide body 43 is close to the lower end of the intermediate moving guide body 44. Accordingly, the first belt-fixing portion 53 fixed to the upper portion of the tip-moving guide body 43 is closest to the lower pulley 51b attached to the intermediate moving guide body 44. On the other hand, the upper end of the intermediate moving guide body 44 is close to the lower end of the stationary guide body 41. Accordingly, the second belt-fixing portion 54 fixed to the lower portion of the stationary guide body 41 is closest to the upper pulley 51a attached to the intermediate moving guide body 44.

In this state, the holding unit 10 is raised by operating the elevating drive mechanism 22 and winding the belt members 21a and 21b. In this case, the engaging portions 15 and 15 in the housing 11 move between the respective lower long holes 431 in the tip-moving guide bodies 43 and 43, thereby raising the holding unit 10. Then, the engaging portions 15 and 15 respectively come into contact with the engaging target portions 48 and 48 from below (upper surfaces of the engaging portions 15 and 15 respectively come into contact with the lower surfaces of the engaging target portions 48 and 48). In this manner, an upward force is applied to the tip-moving guide body 43, and the tip-moving guide body 43 starts to be raised. As the tip-moving guide body 43 is raised, the first belt-fixing portion 53 is moved upward. As the first belt-fixing portion 53 is moved upward, the endless belt member 52 is rotated clockwise, and the second belt-fixing portion 54 is moved downward. The second belt-fixing portion 54 is fixed to the lower end of the stationary guide body 41, and is not moved by itself. Therefore, practically, the intermediate moving guide body 44 holding the pulleys 51a and 51b supporting the endless belt member 52 is moved upward with respect to the stationary guide body 41, as the endless belt member 52 is rotated clockwise. That is, if the upward force is applied to the tip-moving guide body 43 so that the tip-moving guide body 43 and the first belt-fixing portion 53 are moved upward with respect to the intermediate moving guide body 44, in synchronization (interlocking) with the movement, the intermediate moving guide body 44 is moved upward with respect to the stationary guide body 41. In this manner, the first guide unit 40a (or the second guide unit 40b) shrinks upward.

Next, FIG. 3 illustrates a state where the tip-moving guide body 43 is located at the highest position in the movable range with respect to the intermediate moving guide body 44 and the intermediate moving guide body 44 is located at the highest position with respect to the stationary guide body 41. That is, the upward force is applied to the tip-moving guide body 43, and the tip-moving guide body 43 and the intermediate moving guide body 44 are pulled up against the gravity acting on both of these. The first guide unit 40a (or the second guide unit 40b) is brought into the most shrunk state. In this case, the upper end of the tip-moving guide body 43 is close to the upper end of the intermediate moving guide body 44. Accordingly, the first belt-fixing portion 53 fixed to the upper portion of the tip-moving guide body 43 is closest to the upper pulley 51a attached to the intermediate moving guide body 44. On the other hand, the lower end of the intermediate moving guide body 44 is close to the lower end of the stationary guide body 41. Accordingly, the second belt-fixing portion 54 fixed to the lower portion of the stationary guide body 41 is closest to the lower pulley 51b attached to the intermediate moving guide body 44.

In this state, the holding unit 10 is lowered by operating the elevating drive mechanism 22 and feeding the belt members 21a and 21b. In this case, the engaging portions 15 and 15 in the housing 11 respectively receive the lower surfaces of the engaging target portions 48 and 48 on the upper surfaces of the engaging portions 15 and 15 in the respective lower long holes 431 in the tip-moving guide bodies 43 and 43. Accordingly, as the holding unit 10 is lowered, the tip-moving guide body 43 starts to be lowered due to its own weight. As the tip-moving guide body 43 is lowered, the first belt-fixing portion 53 is moved downward. As the first belt-fixing portion 53 is moved downward, the endless belt member 52 is rotated counterclockwise, and the second belt-fixing portion 54 is moved upward. The second belt-fixing portion 54 is fixed to the lower end of the stationary guide body 41, and is not moved by itself. Therefore, practically, the intermediate moving guide body 44 holding the pulleys 51a and 51b supporting the endless belt member 52 is moved downward with respect to the stationary guide body 41, as the endless belt member 52 is rotated counterclockwise. That is, if the tip-moving guide body 43 and the first belt-fixing portion 53 are moved downward with respect to the intermediate moving guide body 44 since the tip-moving guide body 43 falls due to the weight of the tip-moving guide body 43, in synchronization (interlocking) with the movement, the intermediate moving guide body 44 is moved downward with respect to the stationary guide body 41. In this manner, the first guide unit 40a (or the second guide unit 40b) stretches downward.

As illustrated in FIG. 3, the traveling unit 60 has a wheel 61 rolling on a rail R, and a drive motor unit 62 mounted on the base part 14 and rotationally driving the wheel 61. The control unit 70 controls the drive motor unit 62 so as to rotationally drive the wheel 61, and causes the conveying device 1 including the traveling unit 60 to travel along the rail R serving as a transfer path laid on a ceiling of a factory or a warehouse building.

As illustrated in FIGS. 2 and 3, the falling prevention mechanisms 80 are each installed on the first guide unit 40a and the second guide unit 40b. The lower end of the stationary guide body 41 has a falling prevention frame 81 supported so as to be capable of swinging inward, and a wire 82 for causing the falling prevention frame 81 to swing. The proximal end of the falling prevention frame 81 is pivotally supported by a swing support portion 83 fixed to the lower end of the stationary guide body 41. The lower end of the swing support portion 83 is formed in a horizontal surface, and the horizontal surface serves as a regulating portion of a pivotal posture of the falling prevention frame 81, in particular, a pivotal posture during a closing movement. One end of the wire 82 is connected to an intermediate portion in one side portion or both side portions of the intermediate moving guide body 44, and the other end of the wire 82 is connected to an intermediate portion of one side portion or both side portions of the falling prevention frame 81. If the intermediate moving guide body 44 is moved upward with respect to the stationary guide body 41 together with the tip-moving guide body 43, the intermediate moving guide body 44 to which one end of the wire 82 is connected is moved upward. As a result, the wire 82 is brought into a tensioned state, and the falling prevention frame 81 adopting a vertical posture illustrated in FIG. 2 starts to pivot around the swing support portion 83. Furthermore, the intermediate moving guide body 44 is moved upward. In this manner, the wire 82 is moved upward in a tensioned state, the falling prevention frame 81 pivots as much as 90° so as to adopt a horizontal posture. The posture is regulated by the swing support portion 83. If the intermediate moving guide body 44 is moved upward with respect to the stationary guide body 41 and is located at the highest position in the movable range with respect to the stationary guide body 41, the tip of the falling prevention frame 81 has the same height as the swing support portion 83 attached to the lower end of the stationary guide body 41. When the holding unit 10 holds the tire T, the upper surfaces of the tips of both the falling prevention frames 81 are located on both sides of the lower surface of the tire T. Therefore, the tire T is prevented from falling.

On the other hand, if the intermediate moving guide body 44 is moved downward with respect to the stationary guide body 41 together with the tip-moving guide body 43, the intermediate moving guide body 44 to which one end of the wire 82 is connected is moved downward. As a result, the wire 82 is moved downward while the tensioned state is maintained. In this manner, the falling prevention frame 81 adopting the horizontal posture starts to pivot around the swing support portion 83. Furthermore, the intermediate moving guide body 44 is moved downward. Accordingly, the tensioned state of the wire 82 is released, and the falling prevention frame 81 is rotated as much as 90° so as to adopt a vertical posture. The posture change in the falling prevention frame 81 is operated along with the movement of the tip-moving guide body 43 and the intermediate moving guide body 44. Therefore, there is no interference in the elevating operation of the held tire T and the holding unit 10.

In describing an operation of the conveying device 1 configured as described above, the conveying device 1 is first caused to travel on the rail R by the traveling unit 60. Then, if the conveying device 1 reaches directly above the tire T serving as the conveying object placed on the floor surface, the control unit 70 controls the drive motor unit 62 so as to stop the rotation of the wheel 61 of the traveling unit 60.

Subsequently, if the elevating unit 20 starts feeding the belt members 21a and 21b from the two reel units 23a and 23b by rotating the shaft portion 25 in one direction (forward direction), the holding unit 10 starts to be lowered via the swing support unit 30 to which the respective tips of the belt members 21a and 21b are connected. If the engaging portions 15 on both sides of the housing 11 in the holding unit 10 and the engaging target portion 48 of the pair of tip-moving guide bodies 43 are in contact with each other, the tip-moving guide body 43 is also moved downward as the holding unit 10 is lowered. In this case, the interlocking mechanism 50 is operated, thereby causing the pair of intermediate moving guide bodies 44 to move downward in synchronization (interlocking) with the respective tip-moving guide bodies 43. That is, the first guide unit 40a and the second guide unit 40b stretch downward as the holding unit 10 is lowered. During the stretching process of the first guide unit 40a and the second guide unit 40b, the pair of falling prevention mechanisms 80 is operated, and the posture of the respective falling prevention frames 81 is converted from the horizontal posture into the vertical flat posture, thereby releasing the falling prevention of the tire T.

When the pair of tip-moving guide bodies 43 reaches the lowest position in the movable range with respect to the respective intermediate moving guide bodies 44 and the pair of intermediate moving guide bodies 44 reaches the lowest position in the movable range with respect to the respective stationary guide bodies 41, the first guide unit 40a and the second guide unit 40b are brought into a most stretched state. Thereafter, if the belt members 21a and 21b are fed from the reel unit 23a and 23b, the engaging portions 15 of the holding unit 10 are respectively separated from the engaging target portion 48 of the pair of tip-moving guide bodies 43, and the holding unit 10 is moved downward with respect to the tip-moving guide body 43. When three bars 12 are inserted into the inner periphery of the tire T placed on the floor surface within the movable range of the holding unit 10 with respect to the tip-moving guide body 43, the control unit 70 stops the rotation of the shaft portion 25 in the elevating unit 20, thereby stopping the feeding operation of the belt members 21a and 21b. In this manner, lowering the holding unit 10 is stopped. Thereafter, the control unit 70 operates the displacement mechanism 13 so as to widen the mutual distance of the three bars 12. In this manner, the respective bars 12 are brought into contact with the inner periphery of the tire T, and the tire T is held.

Here, an elevating range of the holding unit 10 is approximately equal to the length required for the elevating unit 20 to feed the belt members 21a and 21b from the reel units 23a and 23b. Therefore, even in a state where the elevating unit 20 feeds the belt members 21a and 21b as much as a predetermined length and the holding unit 10 stops at the lowest position of the tip-moving guide body 43, the weight of the swing support unit 30 and the holding unit 10 is evenly borne by the belt members 21a and 21b. Therefore, the first guide unit 40a and the second guide unit 40b do not bear the weight of the swing support unit 30 and the holding unit 10.

Subsequently, if the elevating unit 20 causes the two reel units 23a and 23b to start winding the belt members 21a and 21b by rotating the shaft portion 25 in the other direction (reverse direction), the holding unit 10 starts to be raised. If the holding unit 10 moves upward with respect to the tip-moving guide body 43 and the engaging portions 15 and 15 on both sides of the holding unit 10 respectively engage with (come into contact with) the engaging target portions 48 of the pair of tip-moving guide body 43 from below, the tip-moving guide body 43 is locked to the holding unit 10. Thereafter, if the reel units 23a and 23b continuously wind the belt members 21a and 21b, the tip-moving guide body 43 is moved upward against its own gravity. In this case, the interlocking mechanisms 50 and 50 of the first guide unit 40a and the second guide unit 40b are operated, thereby causing the intermediate moving guide bodies 44 and 44 to move upward in synchronization (interlocking) with the respective tip-moving guide bodies 43 and 43. That is, the first guide unit 40a and the second guide unit 40b shrink upward as the holding unit 10 is raised. During the process, the pair of falling prevention mechanisms 80 is operated, and the posture of the respective falling prevention frames 81 and 81 is converted from the vertical posture into the horizontal posture. The falling prevention frames 81 and 81 protrude downward of the holding unit 10, thereby preventing the tire T from falling.

If the tip-moving guide bodies 43 and 43 reach the highest position in the movable range with respect to the respective intermediate moving guide bodies 44 and 44, and if the intermediate moving guide bodies 44 and 44 reach the highest position in the movable range with respect to the respective stationary guide bodies 41 and 41, the respective stationary guide bodies 41 and 41, the respective intermediate moving guide bodies 44 and 44, and the respective tip-moving guide bodies 43 and 43 overlap each other, and the first guide unit 40a and the second guide unit 40b complete shrinking. The elevating unit 20 detects the holding unit 10 by using a detection unit (not illustrated) for detecting a raised position of the holding unit 10, stops the rotational driving of the shaft portion 25, and completes a winding operation of the belt members 21a and 21b. In this manner, raising the holding unit 10 is stopped.

Thereafter, the traveling unit 60 is operated so that the conveying device 1 travels on the rail R. In this manner, the tire T held by the holding unit 10 is conveyed to a conveying destination. If the conveying device 1 reaches directly above the conveying destination, the holding unit 10 is lowered using a method of the above-described lowering operation, and the tire T is placed at a predetermined position. Subsequently, the displacement mechanism 13 is operated so as to release the holding of the tire T by bringing the three bars 12 closer to each other. Then, the holding unit 10 is raised again using a method of the above-described raising operation.

According to the conveying device 1 configured as described above, the following advantageous effects can be achieved.

For example, as disclosed in the related art, in a case where the holding unit is hung and supported by the plurality of belts, due to a (thickness) error, a winding predisposition, or a dimensional error of the diameter of the rolling element of the belts serving as the hanging members, there is a possibility of a difference in the heights of the respective tips of the belts. If the heights of the respective belts are different from each other, there is a posture change such as the inclination of the support member hung by the belt, and the posture of the holding unit fixed to the support member is also hung. This posture change of the holding unit impairs stability of the conveying object held by the holding unit. This unstable conveying object results from the shape error or the winding habit of the belt. Consequently, as the belt is lengthened, that is, as the elevating stroke of the holding unit is lengthened, the conveying object becomes noticeably unstable.

According to the conveying device 1 described above, in order to solve this problem in the related art, the holding unit 10 is supported by the swing support unit 30 so as to be capable of swinging. Accordingly, even if there is the above-described posture change in the swing support unit 30 due to above-described factors of the belt members 21a and 21b, the holding unit 10 is not affected, and always maintains the horizontal state without being inclined by itself. In addition, the holding unit 10 performs the elevating operation while being guided by the first guide unit 40a and the second guide unit 40b. Therefore, the holding unit 10 can be prevented from being shaken during the elevating operation. In this manner, the stability of the holding unit 10 during the elevating operation can be maintained, and transfer efficiency of the tire T can be improved. Ensuring the high stability when raising and lowering the holding unit 10 in this way is also effectively applied to a case where the elevating stroke of the holding unit 10 is extended by lengthening the belt members 21a and 21b. In addition, the first guide unit 40a and the second guide unit 40b guide the holding unit 10 while the holding unit 10 is interposed therebetween. Accordingly, the holding unit 10 is less likely to be shaken. That is, it is not necessary to wait until shaking is completed in order to align the holding unit 10 with a tire placement position. Therefore, the transfer efficiency is not degraded.

Figure 4:
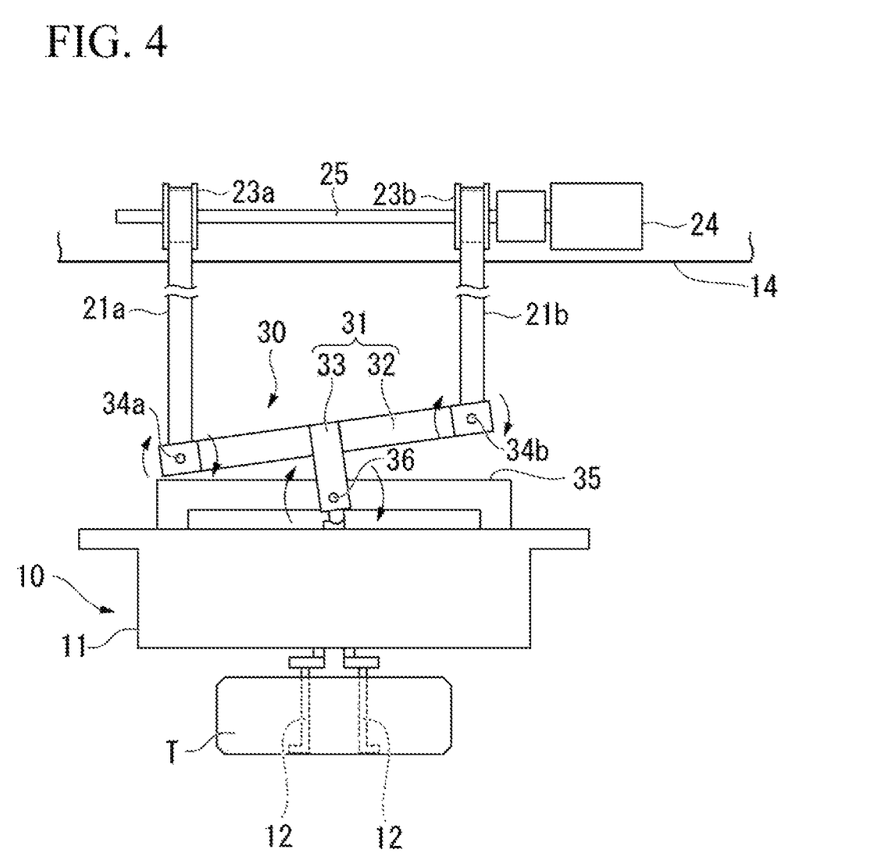
FIG. 4 is a front view illustrating a state where a swing support unit is inclined with respect to a holding unit due to a hanging length difference occurring between two belt members.

As illustrated in FIG. 4, according to the conveying device 1 described above, the respective tips of the belt members 21a and 21b are connected to both ends of the hanging connection portion 31 so as to be pivotable via the first swing connection portion 34a and the second swing connection portion 34b. Accordingly, even if the heights of the respective tips of the belt members 21a and 21b are different from each other, the respective tips of the belt members 21a and 21b are not restricted by the hanging connection portion 31. Therefore, even if there is a posture change such as the inclination of the swing support unit 30, the influence of the posture change in the swing support unit 30 is less likely to be exerted in the width direction of the belt members 21a and 21b. In this manner, the belt members 21a and 21b are not twisted or inclined with respect to the reel units 23a and 23b. Accordingly, the belt members 21a and 21b and the reel units 23a and 23b do not slide. As a result, the holding unit 10 can be stably held, and it is possible to eliminate factors which degrade durability of the conveying device 1, such as wear of the belt members 21a and 21b.

According to the conveying device 1 described above, the belt members 21a and 21b are connected to both ends of the hanging connection portion 31 at an interval in the width direction of the belt member itself. The swing support portion 36 for supporting the holding unit 10 is located at an equal distance between the two belt members 21a and 21b. Furthermore, the two belt members 21a and 21b are connected to the hanging connection portion 31 so that the hanging positions (connection points between the belt members 21a and 21b and the hanging connection portion 31) are located at positions above the centroid of the holding unit 10 in the thickness direction of the belt member itself. In this way, a configuration is adopted as follows. The weight of the holding unit 10 equally acts on the two belt members 21a and 21b, and suitable tension is applied to the two belt members 21a and 21b. In this manner, both the belt members 21a and 21b are uniformly and smoothly fed and wound. Therefore, high stability can be ensured when the holding unit 10 is elevated.

Figure 5A:
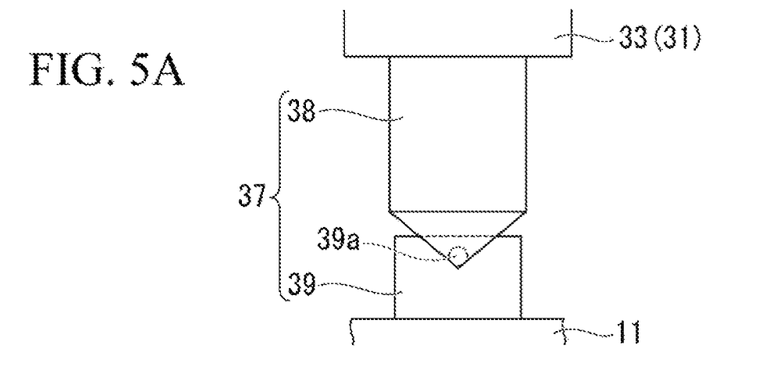
FIG. 5A is a schematic view describing a method of operating a posture detection unit 37, and illustrates a state where a state detection sensor 39 detects whether a detection target 38 is present.

According to the conveying device 1 described above, in a case where the balance of the posture of the swing support unit 30 is lost, such as when the swing support unit 30 is extremely inclined, a hanging state of the holding unit 10 is abnormal. Therefore, according to the conveying device 1 described above, while the holding unit 10 is elevated, the posture detection unit 37 detects (monitors) a change state in a positional relationship between a detector 39a of the state detection sensor 39 and the detection target 38. Specifically, when the holding unit 10 is not inclined with respect to the swing support unit 30, that is, when the horizontal support member 32 and the stationary support member 35 are parallel to each other, the detector 39a of the state detection sensor 39 detects the presence of the detection target 38 located in the front (vertically) as illustrated in FIG. 5A. That is, the state detection sensor 39 detects the position of the detector 39a in a state where the holding unit 10 is supported in a balanced state. In this state, the control unit 70 performs control to regularly operate the elevating unit 20.

Figure 5B:
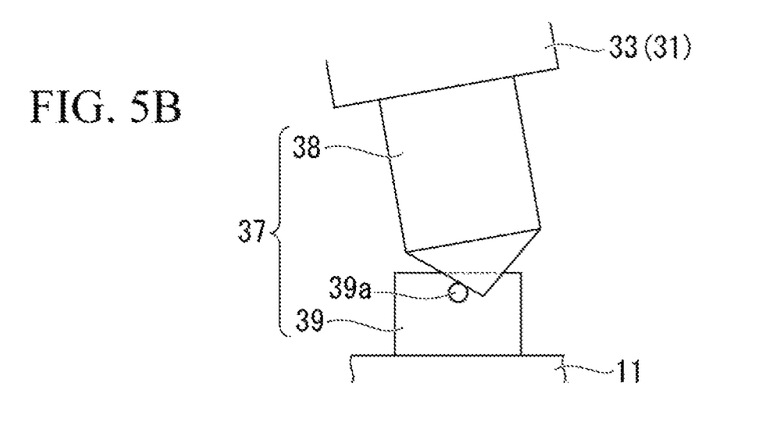
FIG. 5B is a schematic view describing a method of operating the posture detection unit 37, and illustrates a state where the state detection sensor 39 does not detect whether the detection target 38 is present.
Figure 5C:
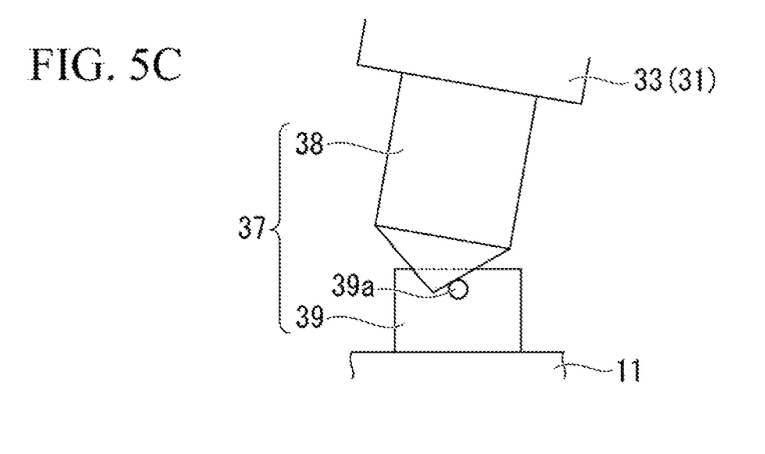
FIG. 5C is a schematic view illustrating a state where the state detection sensor 39 does not detect whether the detection target 38 is present.

If the holding unit 10 or the swing support unit 30 is inclined with respect to each other for some reason, the detector 39a of the state detection sensor 39 cannot detect the presence of the detection target 38 located in the front (vertically) as illustrated in FIG. 5B or 5C. In this case, the control unit 70 controls the operation of the reel units 23a and 23b, based on a detection result of the state detection sensor 39. For example, if it is detected that the holding unit 10 is greatly inclined, the control unit 70 stops the operation of the reel units 23a and 23b so as to stop the elevating operation of the holding unit 10. Thereafter, after the cause of inclining the swing support unit 30 of the holding unit 10 is eliminated, the control unit 70 resumes the operation of the conveying device 1. In this manner, the conveying device 1 can be safely operated. In addition, when the detection target 38 located in the front (vertical) is detected, if the state detection sensor adopts a device which can be detected with detection sensitivity as the state detection sensor, the control unit 70 can control the speed of the operation of the reel units 23a and 23b, based on the detection sensitivity. The elevating operation of the holding unit 10 can thus be controlled at a slower elevating speed than before.

According to the conveying device 1 described above, the first guide unit 40a and the second guide unit 40b have a structure which stretches or shrinks in accordance (interlocking) with the elevating operation of the holding unit 10. Accordingly, it is not necessary to perform adjustment for synchronizing the elevating operation of the holding unit 10 with the stretching operation or the shrinking operation of the first guide unit 40a and the second guide unit 40b. Accordingly, the structure is simplified, and maintenance work is improved. Moreover, the weight of the holding unit 10 is borne by the elevating unit 20 via the belt members 21a and 21b, and the burden of the weight of the holding unit 10 on the first guide unit 40a and the second guide unit 40b is reduced. Accordingly, the first guide unit 40a and the second guide unit 40b do not need high rigidity, and the weight of the device can be reduced.

In addition, the first guide unit 40a and the second guide unit include the interlocking mechanisms 50 and 50 which move the tip-moving guide bodies 43 and 43 and the intermediate moving guide bodies 44 and 44 in an interlocking state with each other, in accordance with the elevating operation of the holding unit 10. Accordingly, it is possible to increase the length in which the first guide unit 40a and the second guide unit 40b can stretch and shrink.

This configuration is effectively applicable to a case where the elevating stroke of the holding unit 10 is extended by reliably lengthening the belt members 21a and 21b fed from the reel unit 23a and 23b by the elevating unit 20.

In addition, the number of the intermediate moving guide bodies 44 and the interlocking mechanisms 50 may be increased or decreased if necessary. Even if the dimensions in the elevating direction of the conveying device 1 when the first guide unit 40a and the second guide unit 40b shrink are limited within a predetermined range, the number of sets of the respective intermediate moving guide body 44 and interlocking mechanism 50 can be increased. In this manner, the total length during the stretching can be set to a predetermined length while the dimensions during the shrinking in the elevating direction are set to fall within the predetermined range. For example, in a case where sets of a new intermediate moving guide body (including a new intermediate guide rail and a new intermediate guide member) and a new interlocking mechanism are respectively added between the tip-moving guide bodies 43 and 43 of the first guide unit 40a and the second guide unit 40b and the previously configured intermediate moving guide bodies 44 and 44, a fixing destination of the first belt-fixing portion 53 fixed to the previously configured tip-moving guide body 43 is fixed to the upper end of the intermediate moving guide body to be added. In addition, the second belt-fixing portion of the intermediate moving guide body to be added is fixed to the lower end of the previously configured intermediate moving guide body 44, and the first belt-fixing portion of the intermediate moving guide body to be added is fixed to the upper end of the tip-moving guide body 43. In this way, the number of the intermediate moving guide bodies is increased. In this manner, it is possible to extend the elevating stroke of the first guide unit 40a and the second guide unit 40b.

According to the conveying device 1 described above, the conveying device 1 includes the traveling unit 60. Accordingly, the tire T held by the holding unit 10 can be conveyed along the rail R, and the tire T can be conveyed in a three-dimensional range. In this manner, it is possible to more freely design a layout for a work area inside a building where the conveying device 1 needs to be installed. In the present embodiment, a case has been described where the conveying device 1 is configured to include the traveling unit 60 so as to move the tire T above the work area. However, without configuring the traveling unit 60, a configuration may be adopted in which the tire T is elevated so as to be conveyed by the elevating unit 20.

Hitherto, the preferable embodiment according to the present invention has been described. However, the present invention is not limited to the above-described embodiment. Additions, omissions, substitutions, and other modifications of the configurations can be made within the scope not departing from the gist of the present invention.

First, in the present embodiment, an example has been described in which the tire T is conveyed as the conveying object. However, the conveying device of the present invention can convey not only the tire but also various articles. A mechanism for holding the conveying object of the holding unit 10 may adopt a suitable structure, depending on a form of the conveying object.

In the present embodiment, the belt member is adopted as the hanging member. However, a wire or a chain may be adopted instead of the belt member. In addition, in the present embodiment, the holding unit 10 is elevated using the two belt members. However, the number of the hanging members is not limited to two. Two or more hanging members may be used so as to raise and lower the holding unit 10.

In addition, both the reel units 23a and 23b are fixed to the shaft portion 25, and both of these are rotationally driven by the drive motor unit 26. However, a structure for rotationally and individually driving each of the reel units 23a and 23b may be adopted so as to separately control the reel units 23a and 23b to be rotationally driven. For example, if the posture detection unit 37 detects the inclination of the holding unit 10 with respect to the swing support unit 30, the control unit 70 sets the rotational speed of one reel unit to be slightly faster or slower than the rotational speed of the other reel unit, thereby eliminating slight inclination of the swing support unit 30 with respect to the holding unit 10. That is, when the heights of the two swing connection portions 34a and 34b installed on both ends of the horizontal support member 32 are compared with each other, the rotational speed is set to be slightly faster for the reel unit around which the belt member connected to the swing connection portion located relatively below is wound. Alternatively, the rotational speed is set to be slightly slower for the reel unit around which the belt member connected to the swing connection portion located relatively above is wound. In this manner, a height difference between the two swing connection portions 34a and 34b is eliminated, and the posture of the swing support unit 30 (horizontal support member 32) recovers the horizontal state.

In the present embodiment, the holding unit 10 is pivotally supported by the swing support unit 30 via the swing support portion 36. However, a ball joint may be adopted for the swing support portion 36.

In the present embodiment, the state detection sensor 39 which always detects the position of the holding unit 10 with respect to the detection target 38 fixed to the swing support unit 30 side is adopted as the inclination detection unit. In a case where a positional change amount of the holding unit 10 with respect to the detection target 38 exceeds a certain magnitude, the elevating operation of the holding unit 10 is stopped. However, an inclination angle sensor for detecting the inclination magnitude of the swing support unit 30 in the horizontal direction may be adopted. The holding unit 10 is connected to the swing support unit 30 so as to be pivotable, and the holding unit 10 always maintains the horizontal state except for a case where the weight balance of the tire T itself is biased. Therefore, the inclination angle sensor detects the inclination of the swing support unit 30. In this manner, it is possible to predict interference with the holding unit 10.

In the present embodiment, the first guide unit 40a and the second guide unit 40b respectively adopt a structure in which one intermediate moving guide body 44 is interposed between the stationary guide body 41 and the tip-moving guide body 43. However, the first guide unit 40a and the second guide unit 40b may adopt a structure in which a plurality of the intermediate moving guide bodies 44 are interposed between the stationary guide body 41 and the tip-moving guide body 43.

Also, as the interlocking mechanism 50, the pair of pulleys 51a and 51b and the endless belt member 52 are installed on the intermediate moving guide body. However, the belt member 52 may be replaced with a chain, and the pulleys 51a and 51b may be replaced with sprockets.

INDUSTRIAL APPLICABILITY

The present invention relates to workpiece transfer between a first workpiece standby position and a second workpiece-holding position, and relates to a conveying device which transfers workpieces whose respective positions are arranged up and down, and which transfers the workpieces along a transfer path disposed above the first workpiece standby position. According to the present invention, a holding unit which holds a conveying object can be prevented from being shaken during an elevating operation, and the conveying object can be efficiently conveyed.

REFERENCE SIGNS LIST

1: conveying device
10: holding unit (holding unit)
14: base part
20: elevating unit
21a, 21b: belt member (hanging member)
23a, 23b: reel unit
30: swing support unit (support member)
31: hanging connection portion (hanging holding member)
36: swing support portion
37: posture detection unit (inclination detection unit)
40: elevating guide unit (guide unit)
40a, 40b: guide unit
41: stationary guide body
41a, 41b: stationary guide rail
42: moving guide body
43: tip-moving guide body
43a, 43b: tip guide rail
44: intermediate moving guide body
44a, 44b: intermediate guide rail
45a, 45b: intermediate guide member
46a, 46b: tip guide member
47a, 47b: holding guide member
50: interlocking mechanism
51a, 51b: pulley (rolling element)
52: endless belt member
53: first belt-fixing portion (one fixing portion)
54: second belt-fixing portion (other fixing portion)
60: traveling unit (traveling unit)
70: control unit (control unit)
80: falling prevention mechanism
R: rail (transfer path)
T: tire (conveying object)

The invention claimed is:

1. A conveying device, comprising:
   a holding unit configured to hold a conveying object;
   a support member swingably supporting the holding unit;
   a plurality of hanging members, each distal end of which is connected to the support member so as to hang the holding unit via the support member;
   reel units to which each proximal end of the plurality of hanging members is connected so as to be capable of feeding and winding;
   a base part on which the plurality of reel units are mounted;
   a guide unit configured to engage with the holding unit, and guide the holding unit to be elevated; and
   a control unit configured to perform operation control on the reel units so as to feed and wind the hanging member,
   wherein the holding unit engages with the guide unit so as to be slidable in an elevating direction of the holding unit.

2. The conveying device according to claim 1, wherein the support member includes a hanging holding member holding each distal end of the hanging members and swing connection portions through which the hanging holding member is connected to the hanging members so as to be pivotable.

3. The conveying device according to claim 2, wherein the hanging members are belt members each having a predetermined width and thickness,
wherein two of the belt members are connected to the support member so as to be arranged side by side with each other at an interval in the width direction while a swing support portion of the support member for supporting the holding unit being located between the two belt members, and
wherein the two belt members are connected to the support member such that each of hanging positions of the two belt members is located at a position above a centroid position of the holding unit, each of the hanging positions being a connection point between a belt member of the two belt members and the hanging holding member, and
wherein each of the hanging positions is located at the same position as the centroid position of the holding unit in a direction of the thickness of the two belt members.

4. The conveying device according to claim 3, further comprising:
a first reel-assisting portion and a second reel-assisting portion which are arranged between the reel units and the holding unit,
wherein the first reel-assisting portion and the second reel-assisting portion regulate positions of the two belt members to certain positions in a horizontal direction, the horizontal direction corresponding to the direction of the thickness of the two belt members,
positions of the two belt members hung from the certain positions in a vertical direction are adjusted to be located directly above the swing connection portions.

5. The conveying device according to claim 1, further comprising: an inclination detection unit configured to detect inclination of the holding unit with respect to the support member,
wherein the control unit performs the operation control on the reel unit, based on a detection result obtained by the inclination detection unit.

6. The conveying device according to claim 1,
wherein the guide unit includes
a plate-shaped stationary guide body fixed to the base part, and extending in the elevating direction of the holding unit, and
a plate-shaped moving guide body which is supported by the stationary guide body so as to be movable in the elevating direction of the holding unit, and with which the holding unit engages.

7. The conveying device according to claim 6,
wherein the moving guide body includes
a tip-moving guide body with which the holding unit engages, and
an intermediate moving guide body located between the tip-moving guide body and the stationary guide body, and installed so as to be movable relative to each of the tip-moving guide body and the stationary guide body, and
wherein the guide unit includes an interlocking mechanism configured to move the tip-moving guide body and the intermediate moving guide body in an interlocking state with each other, in accordance with an elevating operation of the holding unit.

8. The conveying device according to claim 7,
wherein the stationary guide body includes a stationary guide rail with which an intermediate guide member installed on the intermediate moving guide body engages so as to guide movement of the intermediate guide member,
wherein the intermediate moving guide body includes the intermediate guide member and an intermediate guide rail with which a tip guide member installed on the tip-moving guide body engages so as to guide movement of the tip guide member,
wherein the tip-moving guide body includes the tip guide member, a tip guide rail with which a holding guide member installed on the holding unit engages so as to guide movement of the holding guide member, and an engaging target portion with which an engaging member installed on the holding unit engages,
wherein the interlocking mechanism includes
a pair of rolling elements respectively attached to an upper portion and a lower portion of the intermediate moving guide body, and
an endless belt member wound around the pair of rolling elements so as to drive with rolling of the rolling elements, and
wherein the endless belt member includes a first fixing portion which is provided at a predetermined location of the endless belt member on a side of the moving guide body and is fixed to the moving guide body, and a second fixing portion in which another location on a side of the stationary guide body, which is different from the predetermined location, is fixed to the stationary guide body.

9. The conveying device according to claim 1,
wherein the holding unit is located between a pair of the guide units installed on the base part at an interval therebetween, includes engaging portions whose upper surfaces are contactable with the pair of the guide units in the elevating direction of the holding unit, and is elevated by operating the reel unit.

10. The conveying device according to claim 1, further comprising:
a traveling unit that is installed on the base part and configured to cause the base part to travel along a transfer path formed in a direction intersecting the elevating direction of the holding unit.

* * * * *